United States Patent
Räisänen

(10) Patent No.: US 8,209,213 B2
(45) Date of Patent: Jun. 26, 2012

(54) METHOD FOR THE CONSTRUCTION AND EXECUTION OF A DISTRIBUTED WORKFLOW IN A COMMUNICATION SYSTEM

(75) Inventor: Vilho Räisänen, Helsinki (FI)

(73) Assignee: Nokia Corporation, Espoo (FI)

( * ) Notice: Subject to any disclaimer, the term of this patent is extended or adjusted under 35 U.S.C. 154(b) by 1320 days.

(21) Appl. No.: 11/449,659

(22) Filed: Jun. 9, 2006

(65) Prior Publication Data

US 2007/0106541 A1  May 10, 2007

(30) Foreign Application Priority Data

Nov. 9, 2005 (FI) ................................. 20051137

(51) Int. Cl.
  *G06F 17/50* (2006.01)
(52) U.S. Cl. ................................. 705/7.26; 705/7.27
(58) Field of Classification Search ............. 705/7, 7.26, 705/7.27
  See application file for complete search history.

(56) References Cited

U.S. PATENT DOCUMENTS

| | | | | |
|---|---|---|---|---|
| 5,956,250 | A * | 9/1999 | Gudat et al. ................. | 701/26 |
| 7,395,151 | B2 * | 7/2008 | O'Neill et al. ................ | 701/411 |
| 7,990,279 | B2 * | 8/2011 | Bouressa ..................... | 340/691.1 |
| 2003/0217104 | A1 * | 11/2003 | Hamdan et al. .............. | 709/203 |
| 2004/0049345 | A1 * | 3/2004 | McDonough et al. ......... | 702/12 |
| 2005/0032527 | A1 * | 2/2005 | Sheha et al. ................. | 455/456.1 |
| 2005/0136832 | A1 * | 6/2005 | Spreizer ...................... | 455/3.02 |
| 2005/0182781 | A1 * | 8/2005 | Bouvet ........................ | 707/102 |

FOREIGN PATENT DOCUMENTS

| | | | |
|---|---|---|---|
| EP | 0 780 763 A1 | | 6/2007 |
| WO | WO 03/012706 | * | 2/2003 |
| WO | WO 03/107627 | * | 12/2003 |

OTHER PUBLICATIONS

Gibbons, Phillip B., "*A Stub Generator for Multilanguage RPC in Heterogeneous Environments*", IEEE Transactions on Software Engineering, vol. SE-13. No. 1., Jan. 1987, pp. 77-87.
Kiriha, Yoshiaki et al., "*Concurrent Network Management System Using distributed Processing Techniques*", IEEE 1993, pp. 202-206.
International Search Report PCT/FI2006/000357 filed Nov. 7, 2006.
Second Office Action issued in connection with Chinese Patent Application No. 200780030970.4, mailed May 12, 2011.

* cited by examiner

*Primary Examiner* — Sarah Monfeldt
(74) *Attorney, Agent, or Firm* — Alston & Bird LLP

(57) ABSTRACT

The invention relates to a method for construction of a distributed workflow. A workflow specification comprising the invocation of a number of locatable functions is obtained. The workflow specification is divided into partitions based on the host nodes where the locatable functions are hosted. From the partitions are generated stub configuration rules for each host node, which implement the workflow execution in a given host node. The stub configuration rules are provided to the host nodes. The workflow is executed by exchanging messages between the host nodes along the lines of the original workflow. The workflow may be associated with implementation of a service or it may be for the purposes of network management.

29 Claims, 7 Drawing Sheets

METHOD FOR THE CONSTRUCTION AND EXECUTION OF A DISTRIBUTED WORKFLOW IN A COMMUNICATION SYSTEM

BACKGROUND OF THE INVENTION

1. Field of the Invention

The invention relates to the control of distributed processing and application interoperability in a communication system. Particularly, the invention relates to a method for the construction and execution of distributed workflows in a communication system.

2. Description of the Related Art

Before the introduction of application interoperability architectures and software, applications were designed as monolithic systems operating only within a given hardware and operating system environment. All too often it was very difficult to determine where a given application starts and ends, hence also control execution sequences consisting of multiple applications. The applications formed amoeba like structures without clear interfaces and boundaries.

Facilitated by object-oriented and web services technologies and interoperability solutions emerged new applications can be defined as separate components that are reusable in a variety of business processes. In this approach, a user interface implementing a given workflow needs to be designed as a new business process is introduced. It became also possible to introduce wrapper applications to existing legacy applications. The purpose of a wrapper is to make an existing legacy application to look like a separate reusable component or a set of reusable components. Examples of interoperability architectures comprise, for example, the Common Object Request Broker Architecture (CORBA™) defined by Object Management Group Inc, Distributed Common Object Model (DCOM) defined by Microsoft Corporation and web services technologies. It should be noted that the use of workflows, wrappers and interoperability architectures is by no means restricted to business information technology and business applications. Workflows may also be applied in industrial process control, control of mechanical and electrical devices and communication network management. Workflows may be defined implicitly using a user-interface software component programmed, for example, with VISUAL BASIC®. Workflows may also be defined with a workflow language such as XLANG defined by Microsoft Corporation, Web Service Flow Language (WSFL) defined by IBM inc or Semantic Markup for Web Services (OWL-S) defined by World Wide Web Consortium (W3C). The acronym OWL stands for Ontology Web Language. The OWL-S is specified in the Defense Advanced Research Projects Agency (DARPA) Agent Markup Language (DAML) Program document OWL-S 1.1, November 2004. Workflows comprise a number of task, which comprise, for example, the execution of a reusable software component with parameters, the values of which have been determined earlier in the execution of the workflow. Workflows also comprise functionalities familiar from programming languages such as branching conditions and looping.

In FIG. 1 there is illustrated a workflow comprising an arbitrary number of applications in prior art. In FIG. 1 there is illustrated at least an application 101, an application 102, an application 103, an application 104 and an application 105. The lower case letter n standing for an arbitrary integer indicates that there may be an arbitrary number of applications. The applications are arranged as a sequence. However, there is also illustrated a branching condition, which enables directly the stepping from application 102 to application 104. The workflow is defined, for example, using a Graphical User Interface (GUI). The workflow is specified, in other words, defined using a workflow language. The syntax of the workflow language may, for example, be based on the extensible mark-up language or any other known syntax for similar purposes, which may be parsed by an interpreter or a compiler.

FIG. 2 illustrates the execution of a workflow in a communication system in prior art. In FIG. 2 there is illustrated a workflow management node 250. There are also illustrated three application nodes communicating with workflow management node 250. There is an application node 252, an application node 254 and an application node 256. There may be also any number of application nodes as illustrated with the lower case letter n, which stands for an arbitrary integer. In FIG. 2 it is assumed that there is a workflow consisting of four applications. These applications are invoked sequentially one after another. The workflow specification indicating the execution of these four applications is stored in workflow management node 250. Initially the workflow specification instructs the workflow management node 250 to invoke an application in application node 252. The application invocation request and the accompanying response are illustrated with a double-ended arrow 201. The arrowhead pointing to application node 252 indicates the request and the arrowhead in the opposite direction indicates the response. Thereupon, workflow management node 250 determines from the workflow specification that a second application is to be invoked from application node 252. The application invocation and the associated response are illustrated with arrow 202. Next, workflow management node 250 determines that a third application is to be invoked in application node 254. The application invocation request and the accompanying response from the third application are illustrated with arrow 203. Eventually, the workflow management node 250 determines that a fourth application is to be invoked from application node 256. The application invocation request and the respective response message from the fourth application are illustrated with arrow 204.

The problem in prior art solutions is that a single workflow execution node introduces a single point of failure into the communication network. The workflow execution node must be replicated with a standby node, which becomes a costly solution. Additionally, a carrier grade platform is required in order to synchronize the states of the workflow execution node and the standby node in order to provide a hot-standby configuration. It is also likely that a single workflow execution node, whether replicated or not, is not a scalable solution. The workflow execution node becomes a bottleneck in the system, if a considerable number of workflows must be processed in a short time-frame.

SUMMARY OF THE INVENTION

The invention relates to a method for the construction of distributed workflows in a communication system comprising at least a stub configuration node and at least one host node. The method comprises: obtaining a workflow specification comprising the invocation at least one locatable function and identifiers for each said at least one locatable function; determining said at least one locatable function from said workflow specification; determining for each said at least one locatable function at least one trigger condition; finding a host node for each said at least one locatable function based on the identifier for said locatable function; partitioning said workflow to at least one partition, each said at least one partition being associated with a given host node among said at least one host node, said given host node hosting at least one first locatable function invoked in said partition, said at least one first locatable function being among said at least one locatable function; generating at least a first stub configuration rule set from a first partition among said at least one partition in said stub configuration node; and providing from said stub configuration node said first stub configuration rule set to a first host node among said at least one host node with which the first partition is associated.

The invention relates also to a system for the construction of distributed workflows, the system comprising: at least one stub configuration node configured to obtain a workflow specification comprising the invocation at least one locatable function and identifiers for each said at least one locatable function, to determine said at least one locatable function from said workflow specification, to determine for each said at least one locatable function at least one trigger condition, to find a host node among at least one host node for each said at least one locatable function based on the identifier for said locatable function, to partition said workflow to at least one partition, each said at least one partition being associated with a given host node among said at least one host node, said given host node hosting at least one first locatable function invoked in said partition, said at least one first locatable function being among said at least one locatable function, to generate at least a first stub configuration rule set from a first partition among said at least one partition in said stub configuration node and to provide said first stub configuration rule set to a first host node among said at least one host node with which the first partition is associated; and said first host node among said at least one host node configured to obtain said first stub configuration rule set from said stub configuration node.

The invention relates also to a network node for the construction of distributed workflows, the network node comprising: a definition entity configured to obtain a workflow specification comprising the invocation at least one locatable function and identifiers for each said at least one locatable function, to determine said at least one locatable function from said workflow specification and to determine for each said at least one locatable function at least one trigger condition; a locating entity to find a host node among at least one host node for each said at least one locatable function based on the identifier for said locatable function; a partitioning entity configured to partition said workflow to at least one partition, each said at least one partition being associated with a given host node among said at least one host node, said given host node hosting at least one first locatable function invoked in said partition, said at least one first locatable function being among said at least one locatable function; a construction entity configured to generate at least a first stub configuration rule set from a first partition among said at least one partition in said stub configuration node; and a providing entity configured to provide said first stub configuration rule set to a first host node among said at least one host node with which the first partition is associated.

The invention relates also to a network node for the construction of distributed workflows, the network node comprising: means for obtaining a workflow specification comprising the invocation at least one locatable function and identifiers for each said at least one locatable function; means for determining said at least one locatable function from said workflow specification; means for determining for each said at least one locatable function at least one trigger condition; means for finding a host node among at least host node for each said at least one locatable function based on the identifier for said locatable function; means for partitioning said workflow to at least one partition, each said at least one partition being associated with a given host node among said at least one host node, said given host node hosting at least one first locatable function invoked in said partition, said at least one first locatable function being among said at least one locatable function; means for generating at least a first stub configuration rule set from a first partition among said at least one partition in said stub configuration node; and means for providing said first stub configuration rule set to a first host node among said at least one host node with which the first partition is associated.

The invention relates also to a network node for the processing of distributed workflows, the network node comprising: an installation entity configured to obtain at least one configuration rule set for a partition of a workflow from a stub configuration node; and a stub entity configured to detect an event, said event comprising at least one of the receipt of a first message, receipt of a response from a first locatable function, expiration of a timer and a parameter having a value and to select based on at least one configuration rule among at least one configuration rule set and said event at least one of the output of a second message to a second host node and invocation of a second locatable function.

The invention relates also to a network node for the processing of distributed workflows, the network node comprising: means for obtaining at least one configuration rule set for a partition of a workflow from a stub configuration node; means for detecting an event, said event comprising at least one of the receipt of a first message, receipt of a response from a first locatable function, expiration of a timer and a parameter having a value; and means for selecting based on at least one configuration rule among at least one configuration rule set and said event at least one of the output of a second message to a second host node and invocation of a second locatable function.

The invention relates also to a computer program comprising code adapted to perform the following steps when executed on a data-processing system: obtaining a workflow specification comprising the invocation at least one locatable function and identifiers for each said at least one locatable function; determining said at least one locatable function from said workflow specification; determining for each said at least one locatable function at least one trigger condition; finding a host node for each said at least one locatable function based on the identifier for said locatable function; partitioning said workflow to at least one partition, each said at least one partition being associated with a host node, said host node hosting at least one first locatable function invoked in said partition, said at least one first locatable function being among said at least one locatable function; generating at least a first stub configuration rule set from a first partition among said at least one partition; and providing said first stub configuration rule set to the host node with which the first partition is associated.

In one embodiment of the invention, a workflow initiation message is received to an initiating stub in an initiating host node. The workflow initiation message is processed in the initial stub in said initiating host node.

In one embodiment of the invention, a second message is received from a second host node in a third stub within a third host node. In the third host node, for example, in the third stub, is selected a first locatable function to be invoked based on the second message and at least one first stub configuration rule, which is among at least one second stub configuration rule set. From the third host node is outputted a third message to a fourth stub within a fourth host node based on at least one second stub configuration rule among said at least one second stub configuration rule set, said at least one second stub configuration rule comprising at least one reference to at least one of a parameter value and a response from said first locatable function. In one embodiment of the invention, there is a maximum of one stub for the invocation of a given locatable function. In a host node there may be at least one stub entity.

In one embodiment of the invention, an event is detected in a fifth stub within a fifth host node, said event comprising at least one of: the receipt of a fourth message, receipt of a response from a second locatable function, expiration of a timer and a parameter having obtained a value. Based on at least one third configuration rule among at least one third configuration rule set and said event is selected at least one of: the output of a fifth message to a sixth host node, invocation of a third locatable function, providing a value for a second parameter and evaluation of a fourth configuration rule.

In one embodiment of the invention, a function is a method offered by an object or a set of objects in accordance with object oriented programming, a message exchange pattern with a software entity, a procedure, a mathematical function implemented via software, a program module, a routine, an operating system service or any other sequence of instructions offered by an application, a set of applications or another software entity. The instructions may also comprise output instructions from a host node to a peripheral device. From a function there may be a number of subsequent responses, the last one of which is may be defined as the precondition for a subsequent function.

In one embodiment of the invention, a stub configuration rule set comprises, for example, at least one precondition for the invocation of a function and at least one precondition for the sending of a message to another stub. In one embodiment of the invention a configuration rule set for a stub comprises the processing rules for the stub necessary to implement the workflow, however, in co-operation with other stubs and their processing rules in other nodes. A configuration rule set comprises at least one logical rule, for example, in the form of a function or message precondition.

In one embodiment of the invention, by a locatable function is simply meant a function, which may be hosted in one of the at least one host node, for which the host node is obtained based on the identifier for the locatable function and the hosting of which affects the partitioning of the workflow. The locatable function does not necessarily have to be migrated any single time between any host nodes before, during or after the execution of the workflow, even though this may be the case. In other words, the term locatable function designates a function that affects the partitioning of the workflow. In one embodiment of the invention, in addition to the at least one locatable function in the workflow specification there might also be references to remote functions, which are not subjected to the method of the invention. These functions are treated so that they do not affect to the partitioning of the flow specification. In the stub configuration rule sets generated from the flow specification partitions these functions are accessed using a remote method invocation or remote procedure call mechanism. In addition to the at least one function in the workflow specification there might also be references to fixed services present in each of the host nodes, which are not subjected to the method of the invention and which do not affect the partitioning of the workflow.

In one embodiment of the invention, a workflow initiation message is received from a remote node to a first host node. The first host node contains the stub configured with processing rules from a first partition of the workflow. The remote node may be a network management node, an administrative node or an end-user node. In response to the workflow initiation message, the first host node executes the stub, which processes the processing rules and thus invokes each function to be invoked for the workflow in the first node. Thereupon, the first host node sends a request message to the second host node, which hosts the stub and processing rules corresponding to the subsequent partition of the workflow. In other words, the workflow is executed by exchanging messages between the host nodes along the lines of the original workflow.

In one embodiment of the invention, at least one branching condition is determined from the workflow specification by the definition entity in said stub configuration node. The definition entity determines for each said at least one branching condition at least one action triggered by the satisfaction of said branching condition. Such an action may be the checking of a further branching condition or the invocation of a subsequent function in the flow specification. The invocation of a subsequent function from a subsequent partition entails that to the stub for the current partition is added a rule for the sending of a message to the node hosting the subsequent function. The rule is added by the partitioning entity in the stub configuration node. The necessary message input and output primitives are added to the stub processing rules corresponding to the ingress and egress points of a partition. Wherein the invocation of a function by a stub requires the receiving of multiple messages, for example, one from each stub hosting a previous partition, a finite state model is executed in the receiving stub corresponding to the list of messages mentioned in the preconditions for the function. The finite state model ensures that all messages and message parameter values specified in the function invocation preconditions are received before the function is invoked in the stub. Function invocation preconditions are also referred to as the trigger conditions.

In one embodiment of the invention, the identifier for a second function among said at least one function is provided to a register node from a locating entity in the stub configuration node. In response the register node provides a host name or a host address for a host node that hosts said second function. The register node may comprise, for example, a domain name server or a Lightweight Directory Access Protocol (LDAP) directory.

In one embodiment of the invention, in the first host node is associated a first stub with at least one fourth locatable function. In the first host node is received the first stub configuration rule set and at least one stub configuration rule within the first stub configuration rule set with the at least one fourth locatable function.

In one embodiment of the invention, the host node may be an Internet Protocol node. The host node may also be a mobile node such as a mobile station within a mobile communication network. The host node may also be an arbitrary wireless node configured to communicate with other host nodes directly or via a communication network infrastructure comprising at least base stations and interconnecting nodes via which the base stations communicate. The communication system may be a Wireless Local Area Network (WLAN).

In one embodiment of the invention, the host nodes may be associated with industrial robots in a production plant. Thus, the host node controls an industrial robot. In this case the workflow implements the execution of a production process for a product. The functions might represent control instructions issued to the industrial robots. A function code might comprise the requesting of a sequence of arm or clamp movements from a robot comprising a number of operating arms and clamps, for example. The invention may also be applied in general to a process involving a number of co-operating robots.

In one embodiment of the invention, the communication system comprises at least one of a Global System of Mobile Communications (GSM) network and a Universal Mobile Telephone System (UMTS) network.

In one embodiment of the invention, the computer program is stored on a computer readable medium. The computer readable medium may be a removable memory card, magnetic disk, optical disk or magnetic tape.

The benefits of the invention are related to the distribution of workflow execution in the host nodes that host the functions to be invoked during the execution of the workflow. The invention avoids a single point of failure compared to the solutions where a single execution node executes a plurality of workflows.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE EMBODIMENTS:

Reference will now be made in detail to the embodiments of the present invention, examples of which are illustrated in the accompanying drawings.

Figure 1:
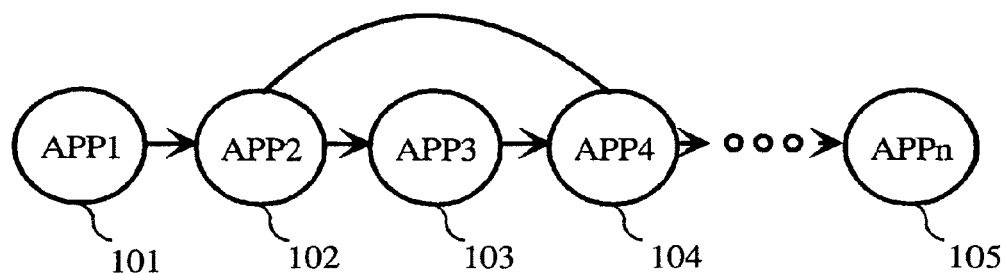
FIG. 1 is a block diagram illustrating a workflow comprising an arbitrary number of applications in prior art.
Figure 2:
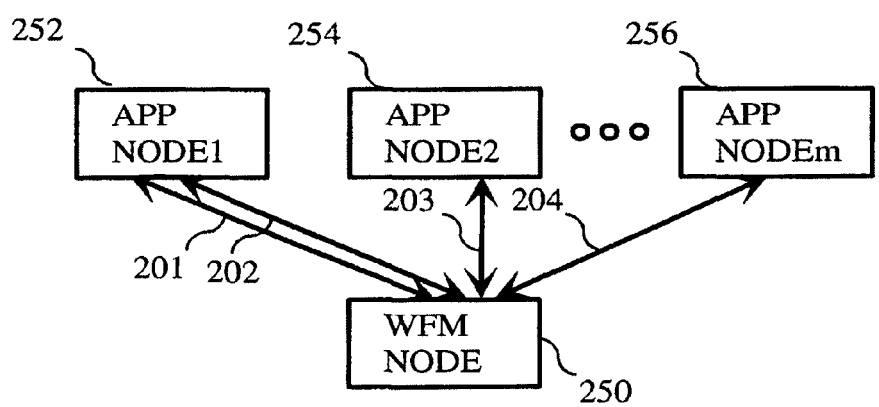
FIG. 2 is a block diagram illustrating the execution of a workflow in a communication system in prior art.
Figure 3:
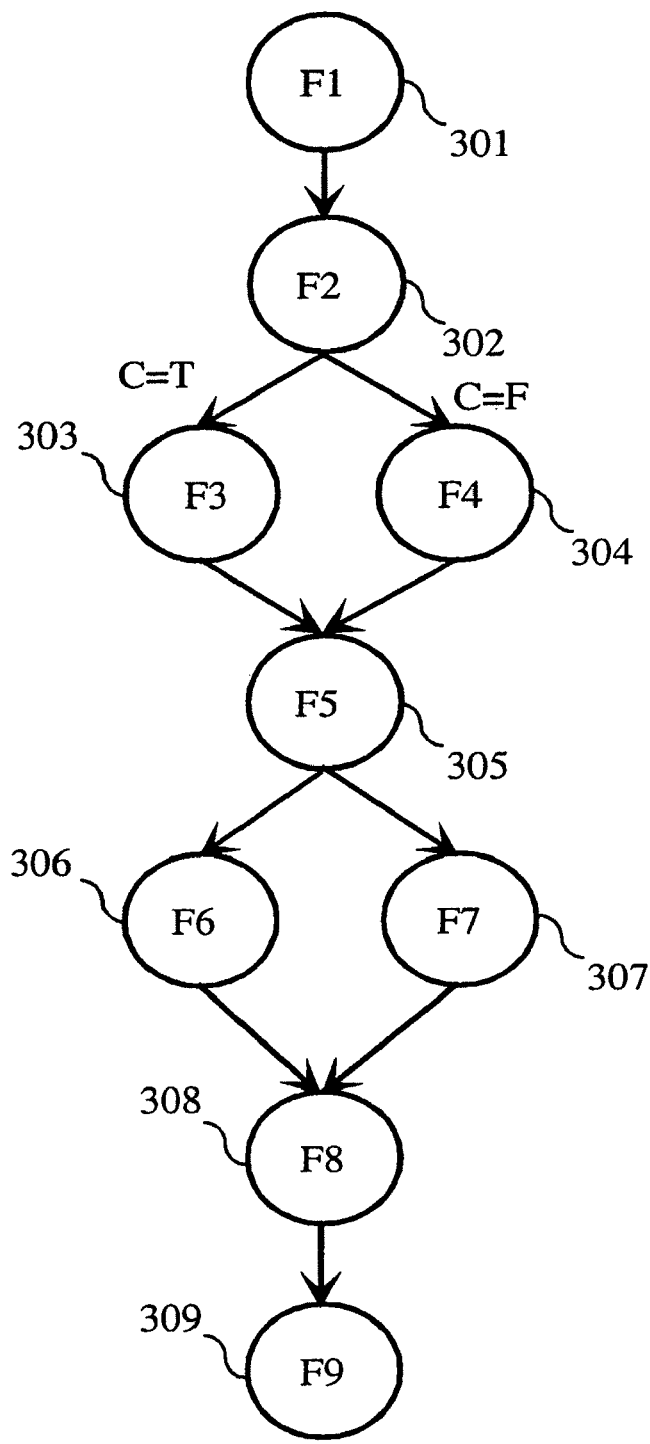
FIG. 3 is a block diagram illustrating a workflow in one embodiment of the invention.

FIG. 3 is a block diagram illustrating a workflow in one embodiment of the invention. The workflow comprises the invocation of nine functions. A function in this context may be a method offered by an object or a set of objects, a message exchange pattern with a software entity, a procedure, a mathematical function implemented via software, a module, a routine, an operating system service or any other sequence of instructions offered by an application, a set of applications or another software entity. A function is often described in association with an interface definition associated with an application, a set of applications or another software entity. A function in this context is invoked and returns a response. The invocation and the response may comprise at least one parameter respectively. It should be noted that a function in this context is not restricted to a function as a mapping in the strict mathematical sense.

In FIG. 3 there are functions from function 301 to function 309. The functions are considered to be locatable functions in the sense that they affect the partitioning of the workflow. Functions 301 and 302 are invoked sequentially and unconditionally. After the invocation of function 302, there are preconditions for functions 303 and 304, which result either in the invocation of function 303 or function 304. The precondition checks the parameters returned by function 302 or parameters produced collectively by the sequence of functions 301 and 302. The branch leading to the function 303 is chosen in case the condition indicated with letter C is equal to T. In other words, the precondition for the invocation of function 303 is C=T. In case C is equal to F the branch leading to function 304 is taken, that is, the precondition for function 304 is fulfilled. Irrespective whether function 303 or function 304 has been invoked, the workflow continues at function 305. The precondition for invoking function 305 is the completion of either function 303 or function 304. After function 305 has been invoked and it has returned parameters comprising their corresponding values both functions 306 and 307 are invoked with a number of parameter values that have been determined during the course the execution of the workflow. The preconditions for the invocation of functions 306 and 3.07 comprise the completion of function 305. Functions 306 and 307 may be in execution simultaneously. As both functions have returned their responses comprising response parameters and their respective values, the workflow may continue at function 308. Function 308 requires response parameters from functions 306 and 307. This is the precondition for the invocation of function 308. In response to the finishing of function 308, function 309 is invoked. After function 309 returns its response the workflow is considered complete. Finally, the parameter values determined during the execution of the workflow are returned to the function, which originally invoked the workflow. According the invention, the workflow is to be divided into partitions based on the nodes hosting each of the functions from 301 to 309.

Stub software components hosted in each host node containing at least one of functions from 301 to 309 are configured with processing rules generated based on information on these partitions. To the processing rules are added the necessary primitives for the implementation of the necessary messages passing between the functions located in different physical network nodes. Also preconditions depending on the receipt of messages are added to the processing rules. For example, a first precondition for the invocation of a first function in an un-partitioned flow specification is replaced with the combination of the first precondition, this time for the dispatching of a first message to the partition involving the invocation of the first function, and a second corresponding precondition for the receipt of the first message, the fulfilling of which results to the invocation of the first function. The precondition for message dispatching is located in a preceding partition and the precondition for message receipt is located in the following partition. Preconditions for functions invoked in parallel are replaced with preconditions for the sending of messages for each of the host nodes hosting at least one of the functions and the corresponding message receipt preconditions triggering the invocation of the functions in the at least one host node.

Figure 4:
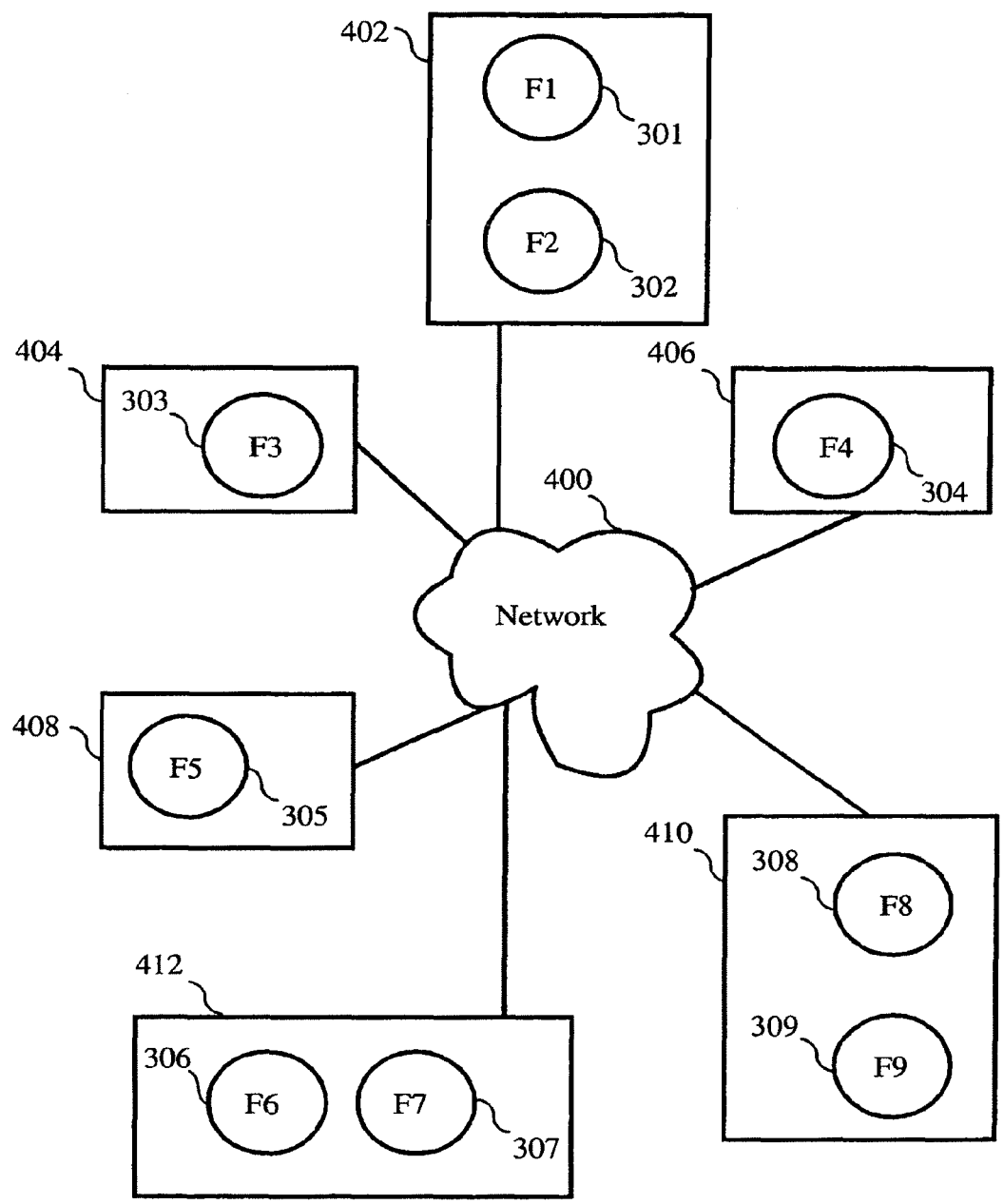
FIG. 4 is a block diagram illustrating a network, which implements workflow execution in one embodiment of the invention.

In FIG. 4 there is illustrated a network 400, which implements workflow execution in one embodiment of the invention. Network 400 comprises six network nodes, which are used to host the nine functions from function 301 to function 309, which are considered to be locatable. There is a network node 402, which hosts functions 301 and 302. There is a network node 404, which hosts function 303. There is a network node 406, which hosts function 304. There is a network node 408, which hosts function 305. There is network node 410, which hosts functions 308 and 309. Finally there is a network node 412, which hosts functions 306 and 307. In one embodiment of the invention, each set of functions hosted in a given host node may be provided by an application or a set of applications or a system software component executing in the host node.

Figure 5:
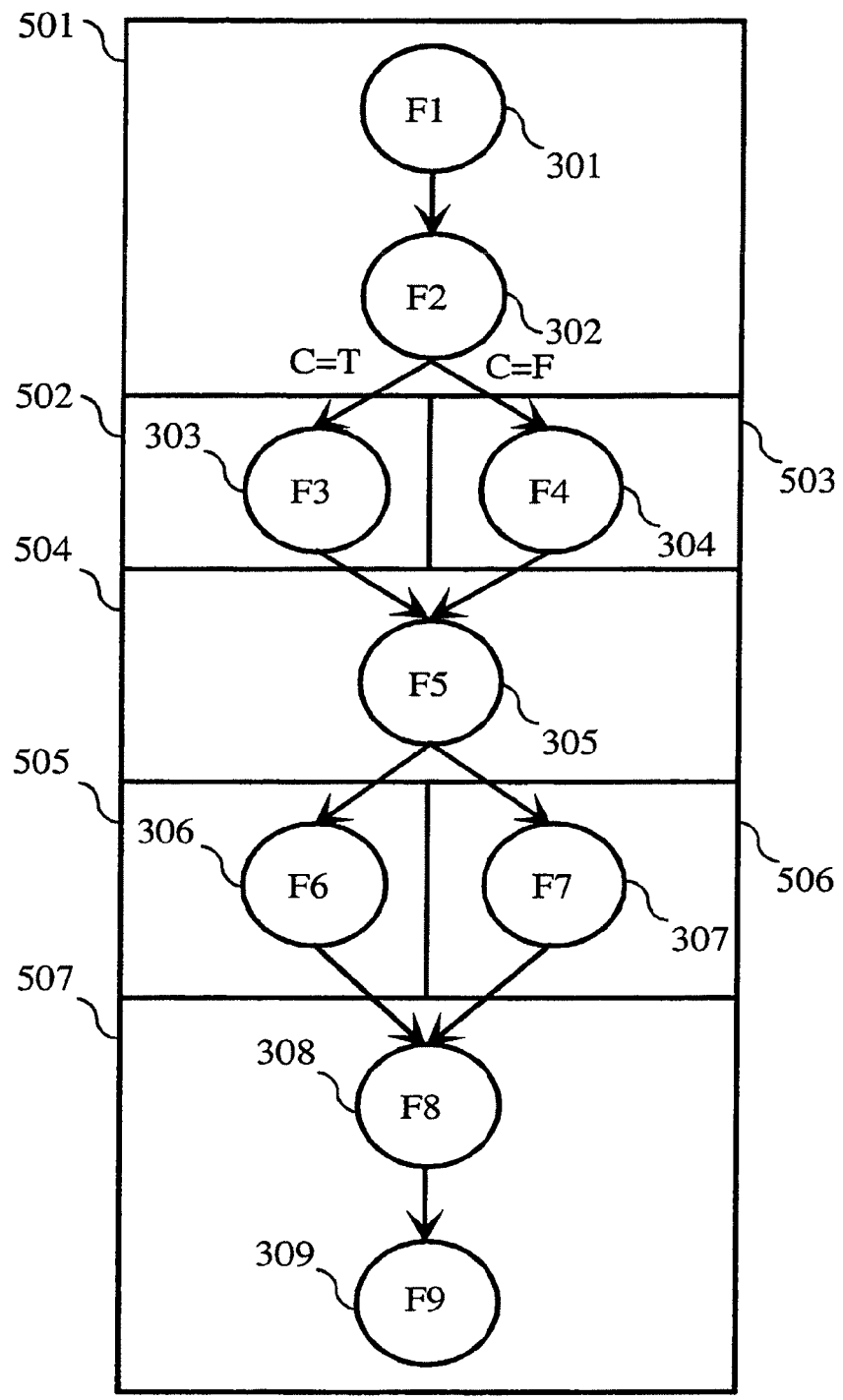
FIG. 5 is a block diagram illustrating the workflow of FIG. 3 after it has been partitioned based on the locations of the functionalities illustrated in FIG. 4 in one embodiment of the invention.

FIG. 5 illustrates the workflow of FIG. 3 after it has been partitioned based on the locations of the functions 301 to 309 illustrated in FIG. 4. Functions 301 to 309 are considered to be locatable. A partition 501 comprises the sequential invocation of functions 301 and 302. It also comprises message dispatch preconditions for the checking of the condition C before the sending of a message to either partition 502 or partition 503. A first message dispatch precondition states that if C=T a message is sent to a partition 502. A second message dispatch precondition states that if C=F a message is sent to partition 503. After either function 303 or 304 has been invoked and completed its execution the dispatch of a message is triggered to partition 504 from either partition 502 or partition 503 based on a precondition originally associated with function 305. In partition 504 there is a precondition for the invocation of function 305, which mandates the receipt of either a message from partition 502 or partition 503. After function 305 has returned its response, message dispatch from partition 504 to both partitions 505 and 506 is triggered based on preconditions originally associated with functions 306 and 307. The preconditions for these functions now require message dispatch to the partitions comprising functions 306 and 307 instead of mere function invocation. Partitions 505 and 506 take care of the receiving of the messages from partition 504. Partitions 505 and 506 comprise preconditions for invoking functions 306 and 307 based on the receipt of a message from partition 504. Functions 306 and 307 are invoked in partitions 505 and 506, respectively. The responses returned form the functions 306 and 307 now trigger the dispatching of messages from the partitions 505 and 506 to partition 507, respectively. In partition 507 the received messages are handled based on the parameter values received from the partitions 505 and 506, as function 308 is invoked. Function 308 returns its response and finally function 309 is invoked. The eventual response from function 309 is returned from partition 506 to the application or function (not shown), which originally invoked the workflow. From the partitions illustrated in FIG. 5 are formed a number of stub configuration rule sets, which are provided for the network nodes illustrated in FIG. 4. It should be noted that the message exchange between the partitions also might comprise the sending of acknowledging messages from a receiving partition to a sending partition. The acknowledgement messages are not shown in FIG. 5.

Figure 6:
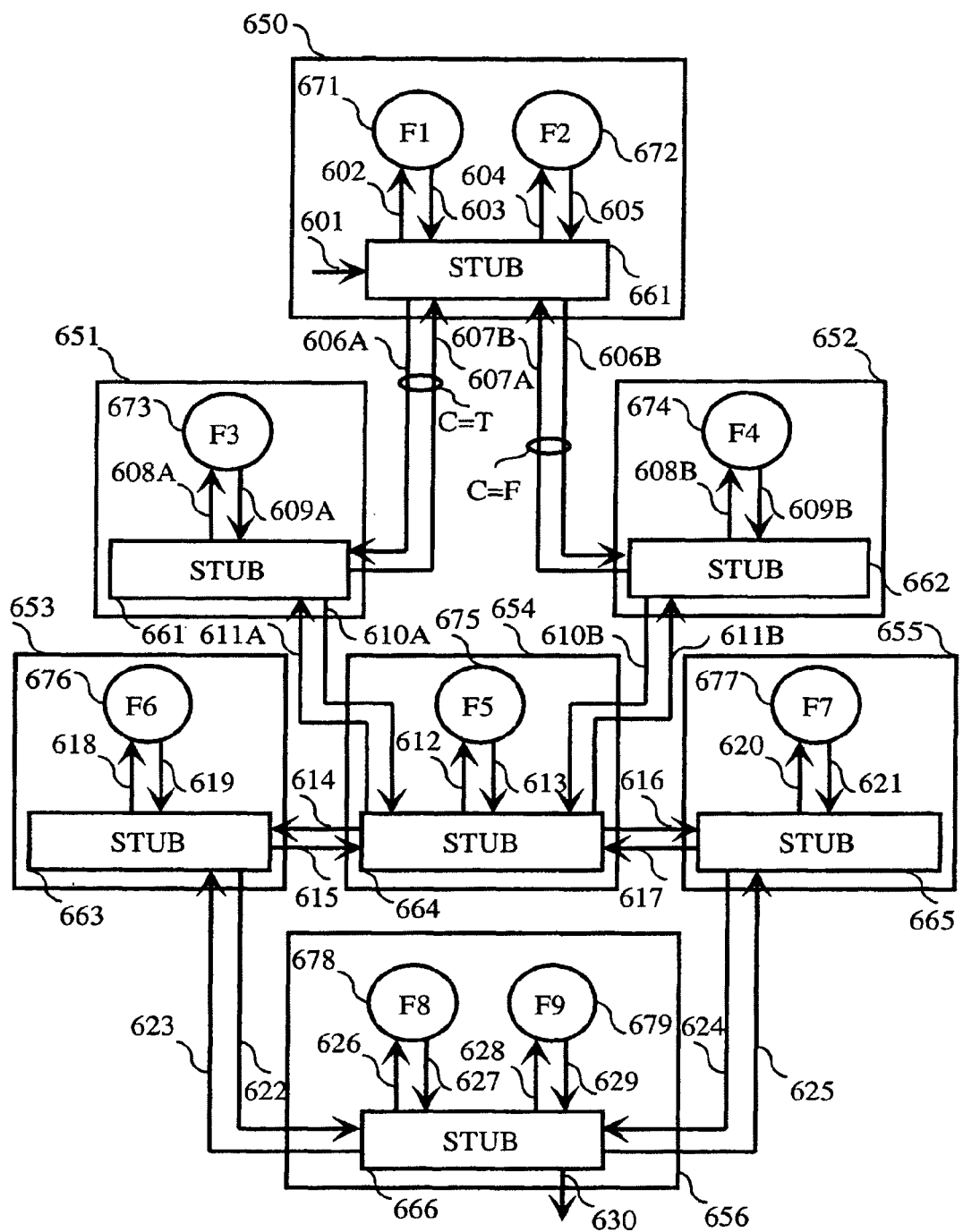
FIG. 6 is a block diagram illustrating the execution of the stubs configured with processing rules generated from the partition information according to FIG. 5 in one embodiment of the invention.

In FIG. 6 there is illustrated the execution of the stubs configured with processing rules generated from the partition information according to FIG. 5 in one embodiment of the invention. The stubs implement the workflow according to the processing rules by invoking the functions as specified in the workflow specification of FIG. 3 and based on the partitioning as illustrated in FIG. 5. The functions illustrated are considered to be locatable. The processing rules comprise the preconditions modified according to the partitioning. In FIG. 6 there are network nodes from 650 to 656. Stub 660 configured with processing rules that are generated from partition 501 is hosted in network node 650. Stub 661 configured with processing rules that are generated using partition 502 is hosted in network node 651. Stub 662 configured with processing rules that are generated from partition 503 is hosted in network node 652. Stub 663 configured with processing rules that are generated using partition 505 is hosted in network node 653. Stub 664 configured with processing rules that are generated using partition 504 is hosted in network node 654. Stub 665 configured with processing rules that are generated from partition 506 is hosted in network node 665. Stub 666 configured with processing rules that are generated from partition 507 is hosted in network node 656.

The execution of the workflow is initiated with message 601. Message 601 may originate from an external network node, which is not shown. Message 601 may also originate from an application (not shown) inside node 650. The invocation of function 671 is illustrated with, arrow 602. The response from the function 671 to stub 660 is illustrated with 603. The invocation of function 672 by stub 660 is illustrated with arrow 604. The response from function 672 to stub 660 is illustrated with arrow 605.

After receiving message 605 stub 660 inspects whether condition C equals to T or F. The letter T and F may correspond to truth-values true and false, respectively. In case the precondition C=T of function 673 is fulfilled stub 660 sends a message to stub 661 as illustrated with arrow 606A. The acknowledgement is illustrated with arrow 607A. In case the precondition C=F of function 674 is fulfilled stub 660 sends a message to stub 662 as illustrated in arrow 606B. The corresponding acknowledgement is illustrated with 607B. The invocation of function 673 by stub 661 is illustrated with arrow 608A. The response from the function 673 is illustrated with arrow 609A. The invocation of function 674 by stub 662 is illustrated with arrow 608B. The response from function 674 is illustrated with arrow 609B. In case function 673 was invoked during the workflow, stub 661 sends a message to stub 664 as illustrated with arrow 610A. The respective acknowledgement is illustrated with arrow 611A. In case function 674 was invoked in the workflow, stub 662 sends a message to stub 664 as illustrated with arrow 610B. The respective acknowledgement is illustrated with arrow 611B. Stub 664 invokes function 675 as illustrated with arrow 612. The response to stub 664 is illustrated with arrow 613. At the response from function 675, stub 664 must cause that functions 676 and 677 are executed in parallel. Naturally, due to restrictions in the communication medium the functions may not be invoked strictly in parallel. The invocation of stub 663 by stub 664 is illustrated with arrow 614. The respective acknowledgement is illustrated with arrow 615. The invocation of stub 665 by stub 664 is illustrated with arrow 616. The corresponding acknowledgement is illustrated with arrow 617. As stub 663 is notified of the completion of function 676 pertaining to invocation 618, stub 663 sends a message to stub 666 as illustrated with arrow 622. The acknowledgement sent from stub 666 to stub 663 is illustrated with arrow 623.

It should be noted that in FIG. 6 it is assumed that function 676 completes the invocation before function 677 completes its respective invocation. Therefore, a message is sent from node 653 to node 656 before a corresponding message is sent from node 655. In response to the receiving of response 621 from function 677, stub 665 sends a message to stub 666 as illustrated with arrow 624. The respective acknowledgement between the stubs is illustrated with arrow 625.

In order to implement the workflow according to its specification stub 666 is configured to wait for both messages 622 and 624 before it is allowed to continue the execution of the workflow in the form of a request to function 678. The checking of the reception of both messages 622 and 624, as mandated in the processing rules installed for stub 666, is implemented, for example, by way of a finite state model. Stub 666 invokes function 678 as illustrated with arrow 626. The response to the function 678 to stub 666 is illustrated with arrow 627. The invocation of function 679 by stub 666 is illustrated with arrow 628. The response from function 679 to stub 666 is illustrated with arrow 629. After having received message 629 stub 666 is able to gather the final results of the execution of the workflow and it acknowledges the successful execution of the workflow to the invoking entity (not shown) or the network node (not shown) as illustrated with arrow 630.

In one embodiment of the invention a given stub in a given host node inspects the stub configuration rule sets provided to it constantly after any event affecting the preconditions mentioned in the stub configuration rule sets. This entails that the stub checks whether the preconditions for each function and each message dispatching mentioned in the rules are fulfilled. This avoids the definition of the stub configuration rule sets and the workflow procedurally instead of mere triggers.

It should be noted that a workflow implemented using stubs might also comprise reverse steps, which are executed if some of the functions returns an error status. The reverse steps in the workflow are as well implemented via messages exchange between stubs. It should be noted that separate function invocations as illustrated in FIG. 6 for separate functions, might actually be directed to different methods provided by a single application. For example, functions 678 and 679 might be separate interfaces or methods provided by a single application hosted in host node 656. For the purposes of the invention and the execution of the workflow, the separate interfaces or methods offered by a single software entity are illustrated as separate functions.

Figure 7:
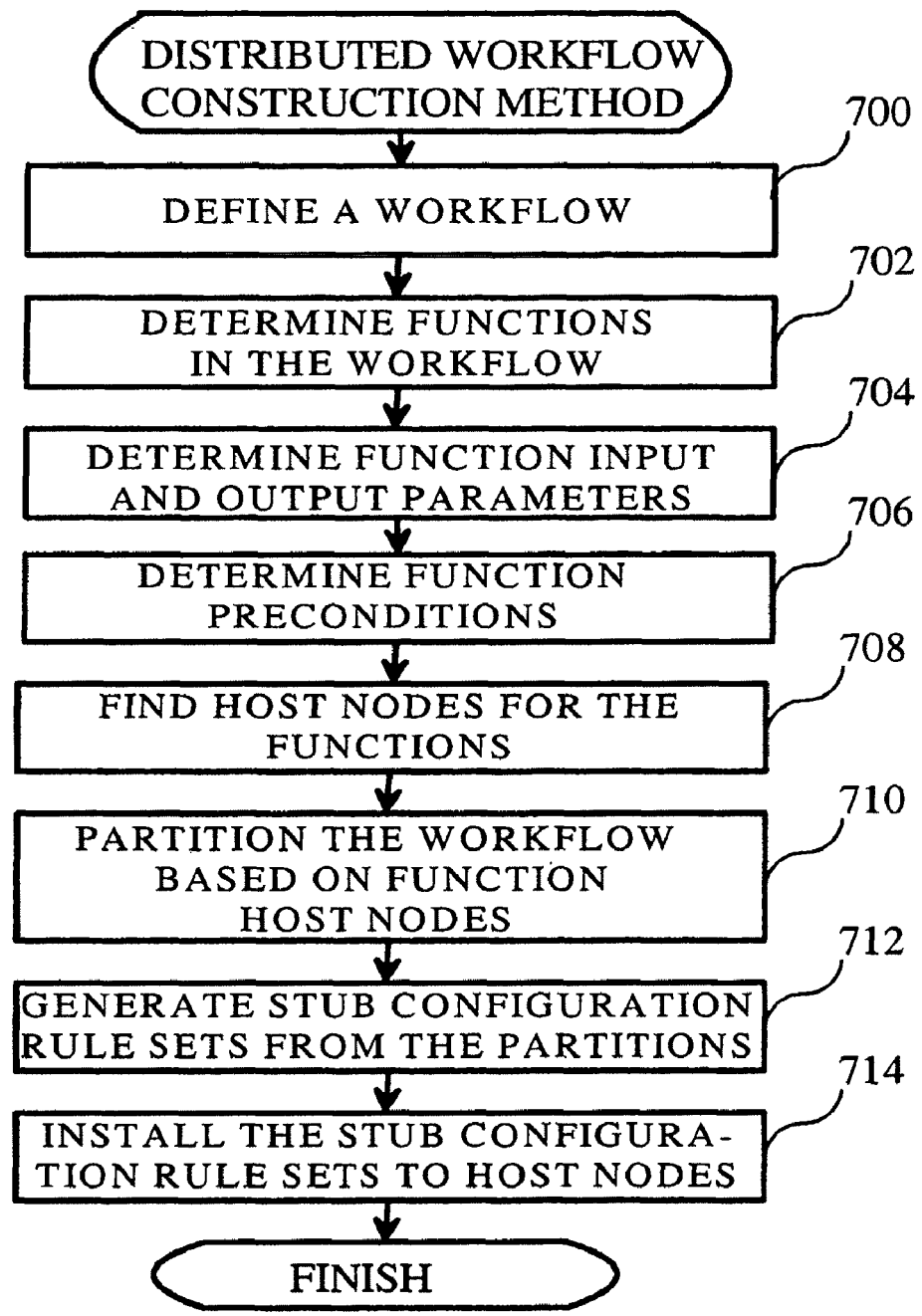
FIG. 7 is a block diagram illustrating a method for the construction of a distributed workflow in one embodiment of the invention.

FIG. 7 illustrates a method for the construction of a distributed workflow in one embodiment of the invention. At step 700 a programmer, a system operator or a network manager, defines a workflow. The workflow may be defined for example using a Graphical User Interface (GUI) provided in a workflow specification node, which may be simultaneously also the stub configuration node. The user interface may provide symbols indicating the execution of a function, a branching condition, a loop condition, function preconditions or other similar programming primitives. A user drags the symbols to a workspace of a display, where a user may assemble from the symbols a flow chart for the workflow. As the workflow is defined it may be tested in a specific testing tool or testing environment. As the workflow is submitted for further processing at step 702 the functions, that is, the locatable functions referenced in workflow are determined. The further processing is performed, for example, in a stub configuration node, which may be the workflow definition node or a separate node. This entails, for example, that the function names or identifiers are gathered in a list. At step 704 the function input and output parameters are determined from the workflow. At step 706 the function preconditions are determined from the workflow specification. The preconditions dictate, for example, which parameters and their respective values must have been obtained before a given function may be invoked. In one embodiment of the invention, the preconditions may also dictate explicitly the functions, the completion of which is a precondition for a subsequent function. In one embodiment of the invention, the preconditions may also dictate implicitly the functions, the completion of which is a precondition for a subsequent function by way of existence of values for given parameters or by way of specific values. In this case all parameters handled by a given function are assumed to have been modified in the function. This information is used in the construction of the processing rules for relevant stubs.

The branching conditions in the workflow are determined explicitly in one embodiment of the invention. In one embodiment of the invention, the post-conditions for functions and the aforementioned branches are determined explicitly. The post-conditions determine what functions must be invoked in response to a response from a given function or the encountering of a given branch in the workflow. In one embodiment of the invention, there are no explicit post-conditions. The post-conditions are merely defined by way of preconditions for functions and the completion of a flow. The preconditions enable the necessary message dispatching and receiving actions preceding the invocation of a given function to be defined in the stub configuration rule sets as a result of the partitioning. The preconditions for message dispatching are obtained from the original function invocation preconditions preceding the partitioning.

At step 708 the host nodes are determined for the functions mentioned in the workflow specification. The determination of host nodes may for example use a mapping from at least part of a function name to a host name or address. For example, a first part of the function name sufficient for the determining of the host node for the function is extracted based on preconfigured rules. The first part is then mapped to the host node for the function. The mapping may use for example the domain name system or it may use a Lightweight Directory Access Protocol (LDAP) node. The LDAP is defined, for example, in the Internet Engineering Task Force (IETF) document RFC 2251. From a domain name system server or from an LDAP protocol node is received the host node name or the host node address. A domain name resolving library used by the stub configuration node may further resolve the host node name into a network address, for example. At step 710 it is determined what host nodes are hosting subsequent function in the workflow. Based on the partition functions to different host nodes the workflow is partitioned into specific partitions that correspond to the host nodes, which host a number of subsequent functions in the workflow. At step 712 the stub configuration rule sets, that is, processing rules are generated from the partitions of the workflow. Required function input parameters are used in the forming of rules for the mapping of message parameters to function parameters. Similarly, required output message parameters are used in the forming of rules for the mapping of function output parameters to message parameters. Information on the partitions is used to determine the required message sending primitives in the stub configuration rules. The result of step 712 is a set of stub configuration rules, which are ready for installation to the host nodes. At step 714 the stub configuration rule sets are installed into the relevant host nodes and their stubs whereupon the method is finished. The stubs are thereafter ready for processing instances of the workflow according to the provided configuration rules.

Figure 8:
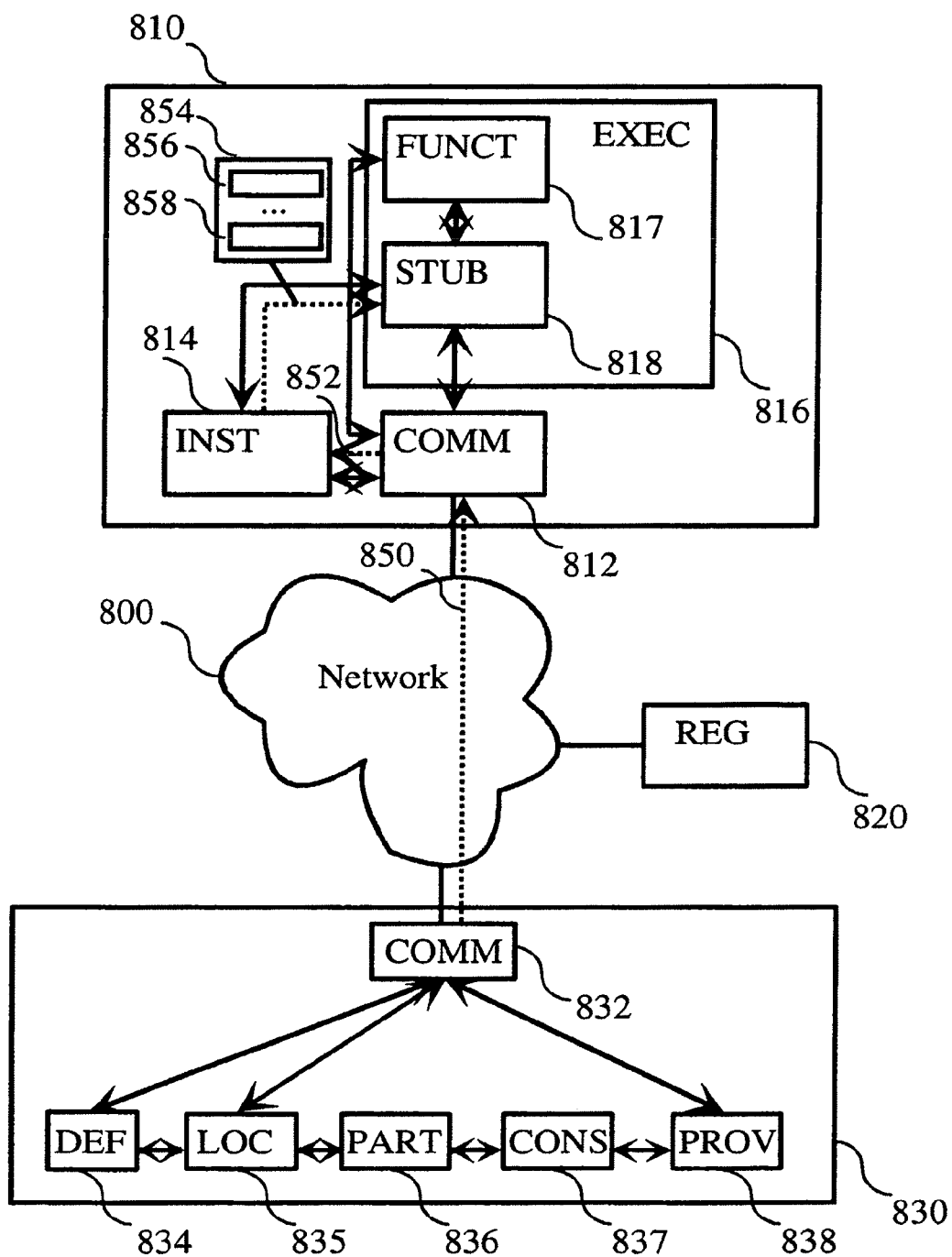
FIG. 8 is a block diagram illustrating a communication system in one embodiment of the invention.

FIG. 8 illustrates a communication system in an embodiment of the invention. In FIG. 8 there is a network 800. To the network is connected a host node 810 and a stub configuration node 830. There is also a register 820, which performs the mapping of function names or parts of function names to host node names or addresses. Stub configuration node 830 comprises a workflow definition tool 834. In other words, it is a workflow definition entity 834. Stub configuration node 830 comprises a function locating entity 835, a workflow partitioning entity 836, a stub configuration rule construction entity 837 and a stub configuration rule providing entity 838. Stub configuration node 830 also comprises a communication entity 832. Communication entity 832 comprises the relevant protocols for the implementation of stub configuration rule installation to host nodes. It comprises, for example, a TCP/IP protocols stack, a Hypertext Transfer Protocol (HTTP) Entity or a File Transfer Protocol (FTP) entity. Communication entity 832 is configured to exchange data with workflow definition entity 834, locating entity 835 and stub configuration rule providing entity 838. In one embodiment of the invention, communication entity 832 communicates with each of the entities from 834 to 838 in turn.

Host node 810 comprises a communication entity 812, which further comprises, for example, a TCP/IP protocol entity and an HTTP protocol entity or an FTP protocol entity. The HTTP protocol is defined in the IETF document RFC 2616 and FTP protocol is defined in the IETF document RFC 959. In host node 810 there is also an execution environment entity 816. The execution environment entity may, for example, be a JAVA® virtual machine or the native operating system of host node 810. Execution environment entity 816 hosts at least one function entity, namely function entity 817, which is a locatable function. Execution environment entity 816 also comprises at least one stub entity for example stub entity 818. Stub entity 818 may comprise, for example, an execution or deduction engine for the processing of the stub configuration rules. Configuration rules for stub entities are installed using an installation entity 814, which receives the stub configuration rules from the workflow definition entity in stub configuration node 830 via network 800. In one embodiment of the invention, an entire stub software entity is provided in place of stub configuration rules, which are dynamic.

Installation entity 814 may also perform the necessary bindings between a given stub entity and a given function entity. In one embodiment of the invention the installation entity 814 may also be comprised within the execution environment entity 816. Also parts of the communication entity 812 may be comprised in execution environment entity 816.

The receipt of a configuration rule set 854, which comprises at least configuration rules 856 and 858, to communication entity 812 is illustrated with arrow 850. Communication entity 812 may provide configuration rule sets directly to stub entity 818 or via installation entity 814, as illustrated with arrow 852. In one embodiment of the invention, installation entity 814 is a part of communication entity 812 or stub entity 818.

In one embodiment of the invention workflow definition entity 834 comprises step 700 illustrated in FIG. 7, locating entity 835 comprises steps 702-708, a workflow partition entity 836 comprises steps 710, a stub configuration rule construction entity 837 comprises step 712 and a stub configuration rule providing entity 838 comprises step 714.

In one embodiment of the invention a complete workflow definition is received to stub configuration node 830. In one embodiment of the invention workflow definition entity 834 comprises a number of patterns for work flows. The patterns define frequently occurring steps or combinations of steps in common workflows. The workflow patterns may be utilised by the user defining the workflow or they may be utilised in the generation of configuration rules for the stubs. The patterns define frequently occurring sequences of steps in flow, which are use for a given purpose. The workflow patterns suggest certain messages exchange patterns, which are necessary for the completion of a fully functional workflow, which does not ignore any possible fourth conditions or necessary messages exchanges. For example a workflow template may ensure that the stubs configuration rules generated contain proper state models for message exchanges and proper message exchange patterns including things such as the acknowledging of messages and proper actions in error conditions.

The software components, that is, workflow definition entity 834, locating entity 835, workflow partition entity 836, stub configuration rule construction entity 837, stub configuration rule providing entity 838, stub 818 and function 817 illustrated in FIG. 8 may be implemented in various ways. They may be implemented as processes executed under the native operating system. The software entities may be implemented as separate processes or so that a number of different software entities is implemented by means of one process. They may be implemented as separate computer programs or as a single computer program. Some software entities may be implemented as modules linked to another entity. The entities may be executed in separate computer units, which communicate via a message bus, a local area network or a network comprising a number of network segments that may further comprise local area networks or backbone networks. A computer unit comprises, for example, a processor, a random access memory, a secondary memory such as a magnetic or optical disk or a flash memory card and a communication interface. The stubs or stub configuration rule sets may be provided to the hosting nodes via a number of intermediate nodes either directly or in a store-and-forward manner.

It is obvious to a person skilled in the art, that with the advancement of technology, the basic idea of the invention may be implemented in various ways. The invention and its embodiments are thus not limited to the examples described above; instead they may vary within the scope of the claims.

The invention claimed is:

1. A method comprising:
obtaining a workflow specification comprising the invocation of at least one locatable function and identifiers for said at least one locatable function, wherein the obtaining occurs within a communication system comprising at least a stub configuration node and at least one host node;
determining said at least one locatable function from said workflow specification;
determining, for said at least one locatable function, at least one trigger condition;
finding one or more host nodes for said at least one locatable function based on an identifier for said locatable function;
causing, by a processor, said workflow specification to be partitioned into at least a first partition and a second partition, said first partition being associated with a given host node among said at least one host node, said given host node hosting at least one first locatable function invoked in said first partition, said at least one first locatable function being among said at least one locatable function;
generating at least a first stub configuration rule set from the first partition in said stub configuration node, wherein the stub configuration rule set includes processing rules for the at least one first locatable function, the processing rules including primitives for implementing messages passed between the at least one first locatable function and other functions from the workflow specification that are associated with other partitions; and
causing said first stub configuration rule set to be provided from said stub configuration node to a first host node among said at least one host node with which the first partition is associated.

2. The method according to claim 1, the method further comprising:
receiving a workflow initiation message to an initiating host node; and
processing said workflow initiation message in an initial stub in said initiating host node.

3. The method according to claim 1, the method further comprising:
receiving a second message from a second host node in a third stub within a third host node;
selecting in said third host node the first locatable function to be invoked based on said second message and at least one first stub configuration rule among at least one second stub configuration rule set; and
causing to be output from said third host node a third message to a fourth stub within a fourth host node based on at least one second stub configuration rule among said at least one second stub configuration rule set, said at least one second stub configuration rule comprising at least one reference to at least one of a parameter value and a response from said first locatable function.

4. The method according to claim 1, the method further comprising:
causing an event in a fifth stub within a fifth host node to be detected, said event comprising at least one of the receipt of a fourth message, receipt of a response from a second locatable function, expiration of a timer and a parameter having obtained a value; and
selecting, based on at least one third configuration rule among at least one third configuration rule set and said event, at least one of the output of a fifth message to a sixth host node, invocation of a third locatable function, providing a value for a second parameter and evaluation of a fourth configuration rule.

5. The method according to claim 1, the method further comprising:
causing the identifier to be provided for a second locatable function among said at least one locatable function to a register node; and
said register node providing a host name or a host address for a host node hosting said second locatable function.

6. The method according to claim 5, wherein said register node comprises a domain name server.

7. The method according to claim 5, wherein said register node comprises a lightweight directory access protocol directory.

8. The method according to claim 1, the method further comprising:
associating in said first host node a first stub with at least one fourth locatable function;
receiving in said first host node said first stub configuration rule set; and
associating at least one stub configuration rule within said first stub configuration rule set with said at least one fourth locatable function.

9. The method according to claim 1, wherein said host node comprises an Internet Protocol node.

10. The method according to claim 1, wherein said host node comprises a mobile station.

11. The method according to claim 1, wherein said host node comprises a wireless node.

12. The method according to claim 1, wherein said host node is associated with an industrial robot.

13. An apparatus comprising at least one processor and at least one memory including computer program code, the at least one memory and the computer program code configured to, with the at least one processor, direct the apparatus to:
obtain a workflow specification comprising the invocation of at least one locatable function and identifiers for said at least one locatable function;
determine said at least one locatable function from said workflow specification;
determine for said at least one locatable function at least one trigger condition;
find one or more host nodes among at least one host node for said at least one locatable function based on an identifier for said locatable function;
cause said workflow to be partitioned into at least a first partition and a second partition, said first partition being associated with a given host node among said at least one host node, said given host node hosting at least one first locatable function invoked in said first partition, said at least one first locatable function being among said at least one locatable function;
generate at least a first stub configuration rule set from the first partition in said stub configuration node, wherein the stub configuration rule set includes processing rules for the at least one first locatable function, the processing rules including primitives for implementing messages passed between the at least one first locatable function and other functions from the workflow specification associated with other partitions; and
cause said first stub configuration rule set to be provided to a first host node among said at least one host node with which the first partition is associated.

14. The apparatus according to claim 13, wherein the apparatus is included in a system, the system further comprising:
an initial host node among said at least one host node configured to receive a workflow initiation message to said initial host node and to process said workflow initiation message in an initial stub.

15. The apparatus according to claim 13, wherein the apparatus is included in a system, the system further comprising:
a third host node configured to receive a second message from a second host node in a third stub, to select a first locatable function to be invoked based on said second message and at least one first stub configuration rule among at least one second stub configuration rule set and to output a third message to a fourth stub within a fourth host node based on at least one second stub configuration rule among said at least one second stub configuration rule set, said second stub configuration rule comprising at least one reference to at least one of a response parameter from said first locatable function.

16. The apparatus according to claim 13, wherein the apparatus is included in a system, the system further comprising:
a fifth host node configured to detect an event in a fifth stub, said event comprising at least one of the receipt of a fourth message, receipt of a response from a second locatable function, expiration of a timer, and a parameter having obtained a value, and to select, based on at least one third configuration rule among at least one third configuration rule set and said event, at least one of the output of a fifth message to a sixth host node and invocation of a third locatable function.

17. The apparatus according to claim 13, wherein the apparatus is further directed to cause the identifier for a second locatable function, among said at least one locatable function, to be provided to a register node, said register node being configured to provide a host name or a host address for a host node hosting said second locatable function.

18. The apparatus according to claim 17, wherein said register node comprises a domain name server.

19. The apparatus according to claim 17, wherein said register node comprises a lightweight directory access protocol directory.

20. The apparatus according to claim 13, wherein being directed to cause said first stub configuration rule set to be provided to the first host node includes said first host node being configured to associate a first stub with at least one fourth locatable function, to receive said first stub configuration rule set, and to associate at least one stub configuration rule within said first stub configuration rule set with said at least one fourth locatable function.

21. The apparatus according to claim 13, wherein said host node comprises an Internet Protocol node.

22. The apparatus according to claim 13, wherein said host node comprises a mobile station.

23. The apparatus according to claim 13, wherein said host node comprises a wireless node.

24. The apparatus according to claim 13, wherein said host node is configured to control an industrial robot.

25. An network node comprising at least one processor and at least one memory including computer program code, the at least one memory and the computer program code configured to, with the at least one processor, direct the network node at least to:
   obtain a workflow specification comprising the invocation of at least one locatable function and identifiers for said at least one locatable function;
   determine said at least one locatable function from said workflow specification;
   determine, for said at least one locatable function, at least one trigger condition;
   find one or more host nodes among at least one host node for said at least one locatable function based on an identifier for said at least one locatable function;
   cause said workflow to be partitioned into at least a first partition and a second partition, said first partition being associated with a given host node among said at least one host node, said given host node hosting at least one first locatable function invoked in said first partition, said at least one first locatable function being among said at least one locatable function;
   generate at least a first stub configuration rule set from the first partition in said stub configuration node, wherein the stub configuration rule set includes processing rules for the at least one first locatable function, the processing rules including primitives for implementing messages passed between the at least one first locatable function and other functions from the workflow specification that are associated with other partitions; and
   cause said first stub configuration rule set to be provided a first host node among said at least one host node with which the first partition is associated.

26. An apparatus comprising at least one processor and at least one memory including computer program code, the at least one memory and the computer program code configured to, with the at least one processor, direct the apparatus at least to:
   obtain at least one configuration rule set for a partition of a workflow from a stub configuration node, the partition being one of at least two partitions of the workflow, wherein the configuration rule set includes processing rules including primitives for implementing messages passed between a function of the partition and a function of another partition; and
   detect an event, said event comprising at least one of the receipt of a first message, receipt of a response from a first locatable function, expiration of a timer, or a parameter having a value;
   select, based on at least one configuration rule among said at least one configuration rule set and said event, at least one of the output of a second message to a second host node and invocation of a second locatable function.

27. A non-transitory computer readable medium having a computer program stored thereon, the computer program comprising code configured to perform the following when executed on a data-processing system:
   obtaining a workflow specification comprising the invocation of at least one locatable function and identifiers for said at least one locatable function;
   determining said at least one locatable function from said workflow specification;
   determining for said at least one locatable function at least one trigger condition;
   finding one or more host nodes for said at least one locatable function based on an identifier for said locatable function;
   causing said workflow to be partitioned into at least a first partition and a second partition, said first partition being associated with a host node, said host node hosting at least one first locatable function invoked in said first partition, said at least one first locatable function being among said at least one locatable function;
   generating at least a first stub configuration rule set from the first partition, wherein the stub configuration rule set includes processing rules for the at least one first locatable function, the processing rules including primitives for implementing messages passed between the at least one first locatable function and other functions from the workflow specification that are associated with other partitions; and
   causing said first stub configuration rule set to be provided to the host node with which the first partition is associated.

28. The non-transitory computer readable medium according to claim 27, wherein said computer readable medium comprises a removable memory card.

29. The non-transitory computer readable medium according to claim 27, wherein said computer readable medium comprises a magnetic or an optical disk.

* * * * *